Figure 1:
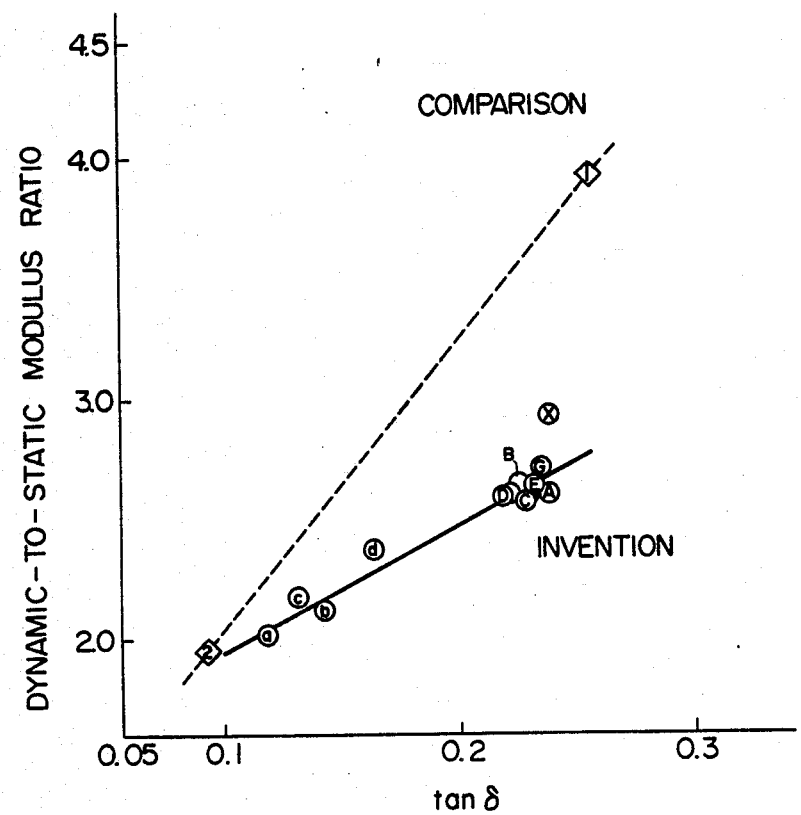

United States Patent [19]

Ohyama et al.

[11] Patent Number: 4,848,511
[45] Date of Patent: Jul. 18, 1989

[54] VIBRATION INSULATING RUBBER

[75] Inventors: Tetsuo Ohyama, Yokohama; Shuichi Akita, Kamakura; Hiroyuki Watanabe, Yokohama; Akio Ueda, Kamakura, all of Japan

[73] Assignee: Nippon Zeon Co., Ltd., Tokyo, Japan

[21] Appl. No.: 219,820

[22] Filed: Jul. 15, 1988

Related U.S. Application Data

[63] Continuation of Ser. No. 844,323, Mar. 26, 1986, abandoned.

[30] Foreign Application Priority Data

Mar. 29, 1985 [JP] Japan .................................. 60-65981

[51] Int. Cl.$^4$ ............................................. B62D 21/00
[52] U.S. Cl. .................................... 180/312; 180/300; 280/716; 267/292
[58] Field of Search ...................... 524/216; 525/333.1, 525/333.2, 351, 331.1; 526/173; 180/312, 300; 280/716; 267/292

[56] References Cited

U.S. PATENT DOCUMENTS

| | | | |
|---|---|---|---|
| 3,846,385 | 11/1974 | Hargis et al. | 526/174 |
| 4,079,176 | 3/1978 | de Zaranz | 526/177 |
| 4,080,492 | 3/1978 | de Zaranz | 526/177 |
| 4,129,705 | 12/1978 | de Zaranz | 526/177 |
| 4,148,985 | 4/1979 | de Zaranz | 526/177 |
| 4,414,363 | 11/1983 | Akita et al. | 525/237 |
| 4,550,142 | 10/1985 | Akita et al. | 525/333.2 |
| 4,555,547 | 11/1985 | Ueda et al. | 525/237 |
| 4,555,548 | 11/1985 | Ueda et al. | 525/237 |

OTHER PUBLICATIONS

Chem. Abstract, CA 104(10): 70138r from EP 150479, 8/7/85.

*Primary Examiner*—Joseph L. Schofer
*Assistant Examiner*—N. Sarofim
*Attorney, Agent, or Firm*—Sherman and Shalloway

[57] ABSTRACT

A vibration insulating rubber having an improved balance between its loss tangent and dynamic-to-static modulus ratio is prepared by molding and curing a rubber compound comprising as a rubber component a modified rubbery polymer obtained by reacting (1) a rubbery polymer having at least one metal selected from alkali metals and alkaline earth metals bonded to its molecular chain with (2) at least one compound selected from organic compounds having a bond of the formula

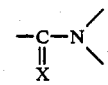

wherein X represents an oxygen or sulfur atom, in the molecule, benzophenones having at least one of unsubstituted and substituted amino groups, and thiobenzophenones having at least one of unsubstituted or substituted amino groups.

6 Claims, 2 Drawing Sheets

VIBRATION INSULATING RUBBER

This application is a continuation, of application Ser. No. 844,323 filed Mar. 26, 1986, now abandoned.

This invention relates to a vibration insulating rubber having an improved balance between its loss tangent and dynamic-to-static modulus ratio. More specifically, it relates to a vibration insulating rubber obtained from a modified rubber polymer prepared by reacting a rubbery polymer having an alkali metal and/or an alkaline earth metal bonded to its molecular chain with an organic compound having a particular atomic grouping.

Generally, the vibration transmissibility, $\tau$, of a vibration insulating rubber is expressed by the following equation (1) by using a vibration model of a support system in which the viscous resistance, C, and the static spring constant, Ks, act on a body having a mass of m.

$$\tau = \sqrt{\frac{1 + (\tan \delta)^2}{\left\{1 - \left(\frac{\omega}{\omega_o}\right)^2\right\} + (\tan \delta)^2}} \quad (1)$$

where $\omega = 2\pi f$ represents the angular velocity (f is the frequency), $$\omega_o = \sqrt{Ks/m}$$

represents the natural frequency, and $\tan \delta = C\omega/Ks$ represents the loss tangent.

In a low frequency region where $\omega$ is close to $\omega_o$, the equation approximates the following equation (2).

$$\tau \approx \sqrt{1 + \frac{1}{(\tan \delta)^2}} \quad (2)$$

In a high freuqency region, it approximates the following equation (3).

$$\tau \approx \frac{1 + \tan \delta}{\left(\frac{\omega}{\omega_o}\right)^2 - 1} \approx \frac{(Ks + C\omega)/Ks}{\left(\frac{\omega}{\omega_o}\right)^2 - 1} \quad (3)$$

In the above equation, $Ks + C\omega = Kd$ is known as the dynamic spring constant, and Kd/Ks, as the dynamic-to-static moldulus ratio.

From equations (2) and (3), it is seen that the vibration transmissibility of the vibration insulating rubber can be decreased by increasing the loss tangent in the low frequency region and decreasing the dynamic-to-static modulus ratio in the high frequency region.

In recent years, automobiles have become sophisticated, and particularly, from the standpoint of riding comfort, there has been an increasing demand for automobiles with reduced vibration noises. For example, in an engine mount of an automobile, it is necessary to insulate vibration in a low frequency region of 10 to 20 Hz which the engine produces during rotation in a nearly idling condition. The use of a rubbery material having a high loss tangent is desirable in producing a vibration insulating rubber used for this purpose. To achieve sound insulation in a high frequency region of at least 100 Hz, for example insulation of indoor noises during driving at high speeds, it is desirable to use a rubber material having a low dynamic-to-static modulus ratio.

No polymer having both vibration insulating and sound insulating properties has heretofore been available for use in vibration insulating rubbers. It is known that vibration insulation and sound insulation, namely the loss tangent and the dynamic-to-static modulus ratio, are in contradictory relation as shown by the fact that a polymer having superior vibration insulating property has inferior sound insulating property, and a polymer having superior sound insulating property has poor vibration insulating property. Accordingly, where vibration insulation is important, a polymer having a high loss tangent is used and its sound insulating property must be sacrificed. It was proposed to use a blend of natural rubber (NR) having superior sound insulating property and styrene/butadiene copolymer rubber (SBR) having superior vibration insulating property, but no satisfactory balance between the loss tangent (tan $\delta$) and the dynamic-to-static modulus ratio has been obtained. It has been desired therefore to develop a novel rubbery material having a good balance between these properties.

It is an object of this invention to provide a vibration insulating rubber having an improved balance between vibration insulation and sound insulation, i.e. between the loss tangent and the dynamic-to-static modulus ratio as the properties of a rubbery material.

According to this invention, this object is achieved by a vibration insulating rubber having an improved balance between its loss tangent and dynamic-to-static modulus ratio prepared by molding and curing a rubber compound comprising as a rubber component a modified rubbery polymer obtained by reacting (1) a rubbery polymer having at least one metal selected from alkali metals and alkaline earth metals bonded to its molecular chain with (2) at least one compound selected from organic compounds having a bond of the formula

wherein X represents an oxygen or sulfur atom, in the molecule, benzophenones having at least one of unsubstituted and substituted amino groups, and thiobenzophenones having at least one of unsubstituted and substituted amino groups.

The rubbery polymer (1) having an alkali metal and/or an alkaline earth metal bonded to its molecular chain may be a so-called living polymer obtained by polymerizing at least one diene monomer such as 1,3-butadiene, isoprene, 1,3-pentadiene and chloroprene, or a mixture of it with another monomer copolymerizable with it (e.g., an aromatic vinyl compound such as styrene and alpha-methylstyrene or an unsaturated nitrile compound such as acrylonitrile and methacrylonitrile) in the presence of a catalyst based on the aforesaid metal. The rubbery polymer (1) may also be one obtained by adding the metal by an after reaction to a diene polymer having conjugated diene units in the polymer chain or a ring-opened polymer of at least one cyloolefin such as cyclopentene and cyclooctene by known techniques such as solution polymerization and emulsion polymerization. In view of the ease of production, the use of living diene polymers is preferred.

Specific examples of the rubbery polymer (1) include polybutadiene rubber, polyisoprene rubber, polychloroprene rubber, styrene/butadiene copolymer rubber (usually having a bonded styrene content of not more than 50% by weight), styrene/isoprene copolymer rubber (usually having a bonded styrene content of not more than 50% by weight), butadiene/isoprene copolymer rubber, acrylonitrile/butadiene copolymer rubber, polypentadiene rubber, butadiene/piperylene copolymer rubber, butadiene/propylene copolymer rubber, polypentenamer, polyoctenamer, and cyclopentene-/dicyclopentadiene ring-opened copolymer rubber. These examples not not limitative. Furthermore, there is no particular restriction on the microstructure of the diene units in the polymers. The microstructure (particularly, 1,2-bond content and 3,4-bond content) and the bound styrene content may be varied depending upon the required levels of the dynamic-to-static modulus ratio and the loss tangent.

The catalysts based on alkali metals or alkaline earth metals used in the polymerization and after addition-reaction may be those which are used in normal solution polymerization. Examples of the alkali metal-based catalysts are those disclosed in Japanese Patent Publication No. 27614/1968. Lithium-type cataysts are typical examples. Catalysts systems comprising compounds of barium, strontium and calcium as main ingredients as disclosed, for example, in Japanese Laid-Open Patent Publications Nos. 115590/1976, 9090/1977, 17591/1977, 30543/1977, 48910/1977, 98077/1977, 112916/1981 and 100146/1982 may be cited as examples of the alkaline earth metal-base catalysts.

The polymerization of the above monomers using these catalysts or the addition reaction of the metal and the polymer using these catalysts can be carried out by using known methods. To balance the dynamic-to-static modulus ratio with the loss tangent as intended by this invention, the amount of the metal bonded to the rubber polymer (1) is at least 0.1 mole, preferably at least 0.3 mole, more preferably at least 0.7 mole, per mole of the polymer. If it exceeds 5 mole%, the rubbery elasticity of the rubbery polymer (1) will undesirably be lost.

The compound (2) to be reacted with the rubbery polymer (1) having the bonded metal is selected from organic compounds having a bond of the formula

(where X is an oxygen or sulfur atom) in the molecule, benzophenones having an amino group and/or a substituted amino group, and thiobenzophenones having an amino group and/or a substituted amino group.

There is no particular restriction on the organic compounds having the

bond in the molecule so long as they react with the aforesaid metals. Examples of such compounds are described in European Patent 150497A. Specific examples include amides and imides such as N,N-diethylformamide, N,N-diethylacetamide, propionamide, 4-pyrididylamide, benzamide, p-aminobenzamide, N',N'-(p-dimethylamino)benzamide, succinimide, nicotinamide, methyl carbamate, N-methylphthalimide and oxamide; ureas such as urea, N,N'-dimethylurea and N,N,N',N'-tetramethylurea; anilides such as N-methylacetanilide and p,p'-di(N,N-diethyl)aminobenzanilide; lactams such as epsilon-caprolactam, N-methyl-epsilon-caprolactam, 2-pyrrolidone, N-methyl-2-pyrrolidone, N-acetyl-2-pyrrolidone, N-methyl-2-quinolone N-methyl-2-indolinone; isocyanuric acids such as isocyanuric acid and N,N',N"-trimethylisocyanuric acid; and sulfur-containing compounds containing these. Especially preferred compounds are those in which an alkyl group is attached to nitrogen.

Examples of the benzophenones having an amino group and/or a substituted amino group and thiobenzophenones having an amino group and/or a substituted amino group are disclosed, for example in British Patent Specification 2117778. Specific examples include 4-aminobenzophenone, 4-dimethylaminobenzophenone, 4dimethylamino-4'-methylbenzophenone, 4,4'-diaminobenzophenone, 4,4'-bis(dimethylamino)benzophenone, 4,4'-bis(diethylamino)benzophenone, 4,4'-bis(ethylamino)benzophenone, 3,3'-dimethyl-4,4'-bis(diethylamino)benzopheonone, 3,3'-dimethoxy-4,4'-bis(dimethylamino)benzophenone, 3,3',5,5'-tetraaminobenzophenone, 2,4,6-triaminobenzophenone, and 3,3',5,5'-tetra(diethylamino)benzophenone; and thiobenzophenones corresponding to these benzophenones. Preferred substituted amino groups are alkyl-substituted amino groups, particularly dialkyl-substituted amino groups. Substituents other than the amino group and substituted amino groups may be present in these compounds so long as they do not adversely affect the reaction.

One especially preferred method of reacting the rubbery compound (1) having the bonded metal with the compound (2) is to add the compound (2) to a solution of the living polymer after the completion of polymerization or a solution of the polymer immediately after the addition-reaction of the metal, and then react them with each other. Usually, the reaction is carried out at room temperature to 100° C., and ends in several seconds to several hours.

The amount of the compound (2) to be reacted with the rubbery polymer (1) having the bonded metal is equimolar to, or slightly in excess of, the amount of the metal bonded to the polymer. After the reaction, a coagulating agent such as methanol is added to the reaction solution, or the reaction solution is treated with stream, to thereby obtain the modified rubbery polymer.

The resulting modified rubbery polymer is considered to be a polymer in which the compound (2) is introduced into the terminals of the molecule of rubbery polymer (1) or into the carbon atoms of the molecular chain as shown by the following formula rubbery polymer molecular chain

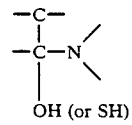

or

-continued rubbery polymer molecular chain

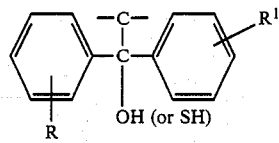

In the formulae, R, and $R^1$ are substituents such as an amino group.

In one embodiment of this invention, the reaction product of the above reaction may further be reacted with an acid and/or a halogen compound to give a modified rubbery polymer having introduced thereinto a salt or a charge transfer complex of the aforesaid atomic grouping.

The site into which the aforesaid compound (2) is introduced may be an end of a molecular chain or another site, preferably the former. A modified rubbery polymer obtained by the reaction of a living diene polymer having a diene structure at the end of a molecular chain with the aforesaid compound is especially preferred because it gives a vibration insulating rubber having further improved vibration insulating property.

The modified rubbery polymer having the aforesaid compound introduced into the polymer chain as the aforesaid atomic grouping may be used singly or in combination with another rubber. When it is used together with the other rubber, the modified rubbery polymer should be included in the starting rubber in an amount of at least 20% by weight. If it is below 20% by weight, no improvement in vibration insulating property can be expected. The other rubber may be selected according to the required properties. Usually, it is, for example, at least one of natural rubber, styrene/butadiene copolymer rubber (obtained by solution polymerization or emulsion polymerization), high cis- or low cis-polybutadiene rubber, high cis-polyisoprene rubber, polypentenamer, polyoctenamer, ethylene/propylene/diene terpolymer rubber.

An especially preferred modified rubbery polymer is obtained by using polybutadiene rubber or styrene/butadiene copolymer rubber as the starting rubbery polymer (1). The polybutadiene and styrene/butadiene copolymer rubber preferably have a 1,2-bonded butadiene unit content of not more than 90 mole%, especially 10 to 70 mole%, based on the entire butadiene units, or a bonded styrene content of 5 to 50% by weight.

The modified rubbery polymer has a Mooney viscosity ($ML_{1+4, 100°C}$) of usually 10 to 200, preferably 20 to 150. If it is less than 10, the mechanical properties such as tensile strength of the polymer are inferior. If it exceeds 200, the miscibility of the modified polymer with another rubber that may be combined is poor, and the processing operation for the polymer becomes difficult. Consequently, a vulcanization product of the resulting rubber compound will have reduced mechanical properties.

All or part of the rubbery component used in this invention may be in the form of an oil-extended rubber.

The vibration insulating rubber of this invention is produced by kneading the starting rubber component (the modified polymer) with various compounding chemicals selected according to the desired type of the vibration insulating rubber (for example, sulfur, stearic acid, zinc oxide, various vulcanization accelerators, reinforcing agents such as FEF carbon black, HAF carbon black and silica, fillers such as calcium carbonate, process oils, and plasticizers) by using a mixer such as a roll or a Banbury mixer, and molding and curing the resulting rubber compound.

The following examples illustrate the present invention specifically.

The vibration insulating properties of a vibration insulating rubber were evaluated on the basis of its loss tangent (tan δ) at 25° C. and 15 Hz and its dynamic-to-static modulus ratio (E*/Es) [E*: complex modulus at 25° C. and 100 Hz; Es: static modulus of elasticity determined from the static shear modulus Gs in accordance with JIS K6301]. The smaller the dynamic-to-static modulus ratio and the larger the tan δ, the better the vibration insulating properties. The measurement was conducted using a Visco Elastic Spectrometer (made by Iwamoto Seisakusho).

The tensile test was carried out in accordance with JIS K6301.

Figure 2:
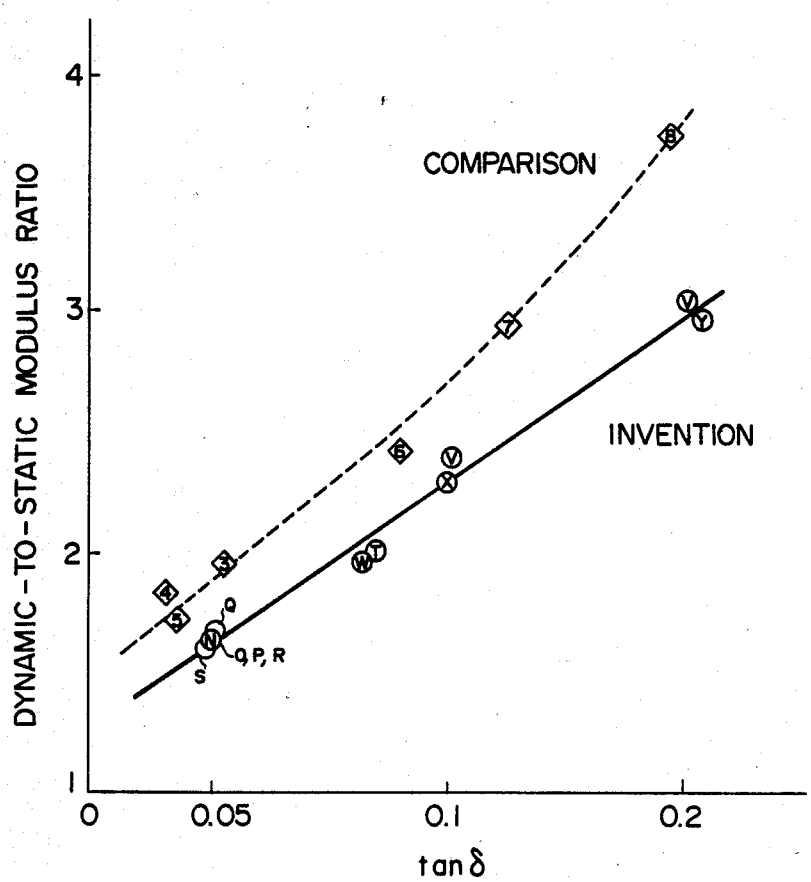

FIG. 1 shows the results of Examples 1 and 4; and
FIG. 2 shows the results of Examples 2 and 3.

The figures and letters used in these drawings indicate the rubbers used in the examples.

EXAMPLE 1

A 2-liter stainless steel polymerization reactor was charged with 150 g of 1,3-butadiene, 820 g of benzene, 0.5 millimole of diethylene glycol dimethyl ether (diglyme) and 1.0 millimole of n-butyllithium (n-hexane solution), and the polymerization was carried out for 1 hour at 40° C. with stirring. After the polymerization, each of the substances shown in Table 2 was added in an amount twice the catalytic amount, and the reaction was carried out for 5 minutes with stirring. In this way, modified polybutadiene rubbers (A to M) having the aforesaid compounds bonded to the ends of the molecular chain were obtained.

For comparison, after the above polymerization, the reaction with the aforesaid compound was not carried out, but methanol was added to separate and recover the polymer (comparative rubber 1).

The compounding agents indicated in Table 1 other than the vulcanizer and the vulcanization accelerator were kneaded with each of the modified rubbers A to M and the comparative rubber 1 by a Brabender-type mixer, and then the vulcanizer and vulcanization accelerator were mixed by a roll. The resulting compound was press-cured at 160° C. for 25 minutes, and the properties of the vulcanized rubber were measured. The results are shown in Table 2.

TABLE 1

| Compounding Recipe I | |
|---|---|
| Ingredient | Parts by weight |
| Rubber (see Table 2) | 100 |
| HAF carbon | 40 |
| Aromatic process oil | 5 |
| Zinc oxide (No. 3) | 5 |
| Stearic acid | 2 |
| Vulcanization accelerator (N—cyclohexyl-2-benzothiazyl sulfenamide) | 1.2 |
| Sulfur | 1.8 |
| Antioxidant (N—isopropyl-N'—phenyl-p-phenylenediamine) | 1.5 |
| Antioxidant (2,2,4-trimethyl-1,2-dihydroquinoline polymer) | 1.5 |
| Total | 158 |

TABLE 2

(Compounding Recipe I)

| Rubber No. | Substance reacted | Mooney viscosity (ML$_{1+4}$, 100° C.) | 1,2-bond (mole %) (*) | Tensile strength (kg/cm$^2$) | Hardness (JIS) | tan δ | Dynamic-to-static modulus ratio (E*/Es) |
|---|---|---|---|---|---|---|---|
| Invention | | | | | | | |
| A | N,N,N',N'—tetramethylurea | 60 | 68 | 158 | 56 | 0.239 | 2.60 |
| B | N,N,N',N'—tetramethylthiourea | 60 | 68 | 160 | 56 | 0.236 | 2.63 |
| C | N,N—diethylacetamide | 60 | 67 | 160 | 56 | 0.229 | 2.57 |
| D | N,N,dimethyl-N',N'—(p-dimethylamino)-benzamide | 61 | 68 | 160 | 56 | 0.220 | 2.58 |
| E | N,N'—dimethylnicotiamide | 61 | 69 | 159 | 57 | 0.233 | 2.63 |
| F | N,N,N',N'—tetramethylaminoacetamide | 60 | 68 | 158 | 56 | 0.238 | 2.59 |
| G | N—methyl-epsilon-caprolactam | 61 | 68 | 160 | 56 | 0.235 | 2.70 |
| H | N—methyl-2-indolinone | 61 | 67 | 162 | 56 | 0.223 | 2.60 |
| I | N—methyl-2-pyrrolidone | 60 | 67 | 160 | 57 | 0.220 | 2.58 |
| J | 4-dimethylaminobenzophenone | 60 | 68 | 158 | 56 | 0.225 | 2.59 |
| K | 4-dimethylamino-4'-methylthiobenzo-benzophenone | 60 | 67 | 162 | 56 | 0.230 | 2.60 |
| L | 4,4'-bis(diethylamino)benzophenone | 61 | 69 | 164 | 56 | 0.231 | 2.63 |
| M | 3,3',5,5'-tetra(diethylamino)benzo-phenone | 60 | 68 | 160 | 56 | 0.228 | 2.60 |
| Comparison | | | | | | | |
| 1 | None | 60 | 68 | 147 | 55 | 0.256 | 3.92 |
| 2 | Natural rubber (RSS #3) | — | — | 276 | 64 | 0.094 | 1.96 |

(*): Determined by an infrared spectrometric method (Hampton's method). The same applies to the subsequent examples.

The results given in Table 2 demonstrate that the vulcanized rubber obtained from the modified polybutadiene of the invention having the substance attached to the ends of the molecular chain has a nearly equal tan δ to, but a much improved dynamic-to-static modulus ratio over, the vulcanized rubber from the polybutadiene of the comparison having no substance attached to it.

EXAMPLE 2

A 2-liter stainless steel polymerization reactor was charged with 150 g of 1,3-butadiene, 820 g of benzene, and 1.2 millimoles of n-butyllithium (n-hexane solution), and the polymerization was carried out for 1 hour at 40° C. with stirring. After the polymerization, each of the substances shown in Table 4 was added in an amount twice the catalytic amount, and the reaction was carried out for 5 minutes with stirring. In this way, modified polybutadiene rubbers (N to S) having the aforesaid compounds bonded to the ends of the molecular chain were obtained.

For comparison, after the above polymerization, the reaction with the aforesaid compound was not carried out, but methanol was added to separate and recover the polymer (comparative rubber 3).

The compounding agents indicated in Table 3 were kneaded with each of the modified rubbers N to S and the comparative rubber 3 in the same way as in Example 1. The resulting compound was press-cured at 160° C. for 25 minutes, and the properties of the vulcanized rubber were measured. The results are shown in Table 4.

TABLE 3

| Compounding Recipe II | |
|---|---|
| Ingredient | Parts by weight |
| Rubber (see Table 4) | 100 |
| FEF carbon | 40 |
| Aromatic process oil | 5 |
| Zinc oxide (No. 3) | 5 |
| Stearic acid | 2 |
| Vulcanization accelerator (N—cyclohexyl-2-benzothiazyl sulfenamide) | 1.2 |
| Sulfur | 1.8 |
| Antioxidant (N—isopropyl-N'—phenyl-p-phenylenediamine) | 1.5 |
| Antioxidant (2,2,4-trimethyl-1,2-dihydroquinoline polymer) | 1.5 |
| Total | 158 |

TABLE 4

(Compounding Recipe II)

| Rubber No. | Substance reacted | Mooney viscosity (ML$_{1+4}$, 100° C.) | 1,2-bond (mole %) (*) | Tensile strength (kg/cm$^2$) | Hardness (JIS) | tan δ | Dynamic-to-static modulus ratio (E*/Es) |
|---|---|---|---|---|---|---|---|
| Invention | | | | | | | |
| N | N,N,N',N'—tetramethylurea | 42 | 11 | 84 | 61 | 0.100 | 1.63 |
| O | N,N'—dimethylnicotiamide | 42 | 11 | 83 | 62 | 0.098 | 1.63 |
| P | N—methyl-epsilon-caprolactam | 41 | 11 | 82 | 61 | 0.101 | 1.65 |
| Q | N—methyl-2-pyrrolidone | 42 | 11 | 84 | 62 | 0.102 | 1.67 |
| R | 4-dimethylaminobenzophenone | 42 | 11 | 83 | 61 | 0.102 | 1.63 |
| S | 4,4'-bis(diethylamino)benzophenone | 41 | 11 | 82 | 61 | 0.098 | 1.62 |
| Comparison | | | | | | | |
| 3 | None | 42 | 11 | 79 | 60 | 0.106 | 1.96 |
| 4 | Natural rubber (RSS #3) | — | — | 257 | 59 | 0.082 | 1.83 |

TABLE 4-continued

| | | (Compounding Recipe II) | | | | | |
|---|---|---|---|---|---|---|---|
| Rubber No. | Substance reacted | Mooney viscosity (ML$_{1+4}$, 100° C.) | 1,2-bond (mole %) (*) | Tensile strength (kg/cm$^2$) | Hardness (JIS) | tan δ | Dynamic-to-static modulus ratio (E*/Es) |
| 5 | High-cis polybutadiene (*) | 42 | — | 81 | 59 | 0.086 | 1.73 |

(*): Nipol BR1220 (a product of Nippon Zeon Co., LTd.)

EXAMPLE 3

In the same way as in Example 1, 1,3-butadiene and styrene in a total amount of 150 g were polymerized using 0.75 millimole of n-butyllithium. After the polymerization, 2.0 millimoles of N-methyl-epsilon-caprolactam was added and reacted. In this way, three modified styrene/butadiene copolymer rubbers (T, U and V) having different styrene contents as indicated in Example 5 and containing the caprolactam compound bonded to the terminals of the molecular chain were obtained. Likewise, three modified styrene/butadiene copolymer rubbers (W, X and Y indicated in Table 5) were obtained by reacting with 2.0 millimoles of 4,4'-bis(diethylamino)benzophenone. For comparison, styrene/butadiene copolymer rubbers (comparative rubbers 6, 7 and 8) were obtained without reaction with the above compound. These rubbers had a 1,2-bonded butadiene unit content of about 37%.

Each of the rubbers was compounded in accordance with Compounding Recipe II to form a rubber compound. The compound was press-cured at 160° C. for 25 minutes. The properties of the resulting rubber are shown in Table 5.

TABLE 5

| | | (Compounding Recipe II) | | | | | |
|---|---|---|---|---|---|---|---|
| Rubber No. | Substance reacted | Mooney viscosity (ML$_{1+4}$, 100° C.) | Bonded styrene (wt. %) (*) | Tensile strength (kg/cm$^2$) | Hardness (JIS) | tan δ | Dynamic-to-static modulus ratio (E*/Es) |
| Invention | | | | | | | |
| T | N—methyl-epsilon-caprolactam | 57 | 11 | 146 | 55 | 0.168 | 2.01 |
| U | N—methyl-epsilon-caprolactam | 60 | 22 | 158 | 55 | 0.202 | 2.38 |
| V | N—methyl-epsilon-caprolactam | 64 | 39 | 162 | 56 | 0.302 | 3.03 |
| W | 4,4'-bis(diethylamino)benzophenone | 57 | 11 | 148 | 56 | 0.164 | 1.96 |
| X | 4,4'-bis(diethylamino)benzophenone | 60 | 22 | 160 | 56 | 0.200 | 2.29 |
| Y | 4,4'-bis(diethylamino)benzophenone | 64 | 39 | 160 | 56 | 0.308 | 2.96 |
| Comparison | | | | | | | |
| 6 | None | 59 | 11 | 152 | 54 | 0.181 | 2.42 |
| 7 | None | 62 | 22 | 160 | 54 | 0.226 | 2.95 |
| 8 | None | 66 | 39 | 166 | 55 | 0.295 | 3.75 |

(*): Determined by an infrared spectrometric method (Hampton's method).

A comparison of rubbers T and W with rubber 6, rubbers U and X with rubber 7, and rubbers V and Y with rubber 8 in Table 5 shows that a vulcanization product of the modified rubber obtained by introducing the substance into the ends of the molecular chain of the styrene/butadiene copolymer rubber has much the same tan δ value as the vulcanization product of the unmodified rubber, but showed a much lower dynamic-to-static modulus ratio that the latter.

EXAMPLE 4

Modified rubber G of Example 1 or modified rubber X in Example 3 was mixed with natural rubber in the ratios shown in Table 6. The mixed rubber was compounded and cured in accordance with Compounding Recipe I as in Example 1. The properties of the vulcanized rubber were measured, and the results are shown in Table 6.

TABLE 6

| | (Compounding Recipe I) | | | | | | |
|---|---|---|---|---|---|---|---|
| Rubber No. | Modified rubber G | Modified rubber X | Comparative rubber Z | Tensile strength (kg/cm$^2$) | Hardness (JIS) | tan δ | Dynamic-to-static modulus ratio (E*/Es) |
| Comparison | | | | | | | |
| 2 | — | | 100 | 276 | 64 | 0.094 | 1.96 |
| Invention | | | | | | | |
| a | 30 | | 70 | 254 | 61 | 0.120 | 2.02 |
| b | 50 | | 50 | 230 | 59 | 0.143 | 2.12 |
| G | 100 | | — | 160 | 56 | 0.235 | 2.70 |
| c | | 30 | 70 | 260 | 62 | 0.133 | 2.16 |
| d | | 50 | 50 | 235 | 61 | 0.164 | 2.36 |
| X | | 100 | — | 203 | 58 | 0.238 | 2.92 |

The results of Examples 1 to 4 are shown in FIGS. 1 and 2 as the relation between the dynamic-to-static modulus ratio and tan δ. FIG. 1 shows the results of Examples 1 and 4 in which Compounding Recipe I was used. FIG. 2 shows the results of Examples 2 and 3 in which Compounding Recipe II was used. It is seen from FIGS. 1 and 2 that according to this invention which uses the modified rubber, vibration insulating rubbers having a good balance between the dynamic-to-static modulus ratio and tan δ can be obtained.

What is claimed is:

1. In combination with an automobile engine an engine mount on which said engine is supported, said mount comprising a molded vibration insulation rubber for providing both vibration insulation and sound insulation and having an improved balance between the loss tangent and dynamic-to-static modulus ratio, said rubber being prepared by molding and curing a rubber compound comprising as a rubber component a modified rubbery polymer obtained by reacting (1) a rubbery polymer having at least one metal selected from alkali metals and alkaline earth metals bonded to its molecular chain with (2) at least one compound selected from benzophenones having at least one of unsubstituted and substituted amino groups, and thiobenzophenones having at least one of unsubstituted or substituted amino groups.

2. The combination of engine and engine mount of claim 1 wherein the rubbery polymer (1) is at least one polymer selected from the group consisting of diene-type polymers and ring-opened polymers of cycloolefins.

3. The combination of engine and engine mount of claim 1 wherein the rubbery polymer (1) is one in which said metal is bonded to the end of the molecular chain.

4. The combination of engine and engine mount of claim 1 wherein the rubbery polymer (1) results from adding said metal to the rubbery polymer by addition-reaction.

5. The combination of engine and engine mount of any one of claims 1 to 4 wherein the benzophenones or the thiobenzophenones contain at least one substituent selected from amino groups and dialkylamino groups.

6. A method for reducing vibration noise in an automobile comprising forming the engine mount of said automobile from a vibration insulating rubber having an improved balance between the loss tangent and dynamic-to-static modulus ratio, said rubber being prepared by molding and curing a rubber compound comprising as a rubber component a modified rubbery polymer obtained by reacting (1) a rubbery polymer having at least one metal selected from alkali metals and alkaline earth metals bonded to its molecular chain with (2) at least one compound selected from benzophenones having at least one of unsubstituted and substituted amino groups, and thiobenzophenones having at least one of unsubstituted or substituted amino groups.

* * * * *

UNITED STATES PATENT AND TRADEMARK OFFICE
CERTIFICATE OF CORRECTION

PATENT NO. : 4,848,511

DATED : July 18, 1989

INVENTOR(S) : Tetsuo Ohyama, Shuichi Akita, Hiroyuki Watanabe and Akio Ueda

It is certified that error appears in the above-identified patent and that said Letters Patent is hereby corrected as shown below:

Claim 1, line 3, delete "insulation", insert --insulating--.

Signed and Sealed this

Fifteenth Day of May, 1990

Attest:

HARRY F. MANBECK, JR.

*Attesting Officer*  *Commissioner of Patents and Trademarks*